(12) United States Patent
Jalali

(10) Patent No.: US 9,859,972 B2
(45) Date of Patent: Jan. 2, 2018

(54) BROADBAND ACCESS TO MOBILE PLATFORMS USING DRONE/UAV BACKGROUND

(71) Applicant: UBIQOMM LLC, San Diego, CA (US)

(72) Inventor: Ahmad Jalali, Rancho Santa Fe, CA (US)

(73) Assignee: Ubiqomm LLC, San Diego, CA (US)

( * ) Notice: Subject to any disclaimer, the term of this patent is extended or adjusted under 35 U.S.C. 154(b) by 67 days.

(21) Appl. No.: 14/222,497

(22) Filed: Mar. 21, 2014

(65) Prior Publication Data

US 2015/0236778 A1    Aug. 20, 2015

Related U.S. Application Data

(60) Provisional application No. 61/940,805, filed on Feb. 17, 2014, provisional application No. 61/946,575, filed on Feb. 28, 2014.

(51) Int. Cl.
*H04B 7/185* (2006.01)
*H04B 7/155* (2006.01)
(Continued)

(52) U.S. Cl.
CPC ....... *H04B 7/18504* (2013.01); *B64C 39/024* (2013.01); *H04B 7/1555* (2013.01);
(Continued)

(58) Field of Classification Search
CPC ............ H04B 7/18504; H04B 7/18528; H04B 7/18543; H04B 7/18539; H04B 7/18578;
(Continued)

(56) References Cited

U.S. PATENT DOCUMENTS 3,568,197 A    3/1971  Cubley
3,780,303 A   12/1973  Smith et al.
(Continued)

FOREIGN PATENT DOCUMENTS

CA    2316440 A1 *  2/2001  ............ H04W 36/32
EP    2369361 A1    9/2011
(Continued)

OTHER PUBLICATIONS

Goldsmith AJ., et al., "Design Challenges for Energy-Constrained Ad Hoc Wireless Networks," Wireless Communications, IEEE, 2002, vol. 9 (4), pp. 8-27.
(Continued)

*Primary Examiner* — Kwang B Yao
*Assistant Examiner* — Moo Ryong Jeong
(74) *Attorney, Agent, or Firm* — Gazdzinski & Associates, PC

(57) ABSTRACT

Systems and methods for providing broadband internet access to mobile platforms such as vehicles, aircraft, and portable devices, using a network of one or more entities such as drones/unmanned aerial vehicles (UAVs). In one embodiment, the drone communication system comprises an antenna sub-system, a radio sub-system and a data switching sub-system. The mobile platforms comprise antenna and radio sub-systems to communicate with the drones, detect changes in the mobile platforms azimuth and elevation changes, and adjust the mobile platform's antenna beam to compensate for the orientation changes to optimally point toward the drones. The exemplary mobile platform further comprises methods to detect the need for handoff to a different drone and to carry out the handoff.

21 Claims, 9 Drawing Sheets

(51) Int. Cl.
*H04W 36/00* (2009.01)
*H04W 84/06* (2009.01)
*H04W 36/30* (2009.01)
*H04W 24/02* (2009.01)
*B64C 39/02* (2006.01)
*H04W 84/00* (2009.01)
*H04W 48/16* (2009.01)
*H04W 88/16* (2009.01)

(52) U.S. Cl.
CPC ..... *H04B 7/18506* (2013.01); *H04B 7/18528* (2013.01); *H04B 7/18539* (2013.01); *H04B 7/18541* (2013.01); *H04B 7/18543* (2013.01); *H04B 7/18554* (2013.01); *H04B 7/18578* (2013.01); *H04W 24/02* (2013.01); *H04W 36/0005* (2013.01); *H04W 36/30* (2013.01); *H04W 84/06* (2013.01); *B64C 2201/122* (2013.01); *H04W 48/16* (2013.01); *H04W 84/005* (2013.01); *H04W 88/16* (2013.01); *Y02B 60/50* (2013.01)

(58) Field of Classification Search
CPC .............. H04B 7/18541; H04B 7/1555; H04B 7/18554; H04B 7/18506; B64C 2201/122; B64C 39/024; H04W 84/06; H04W 36/30; H04W 84/005; H04W 88/16; H04W 24/02; H04W 48/16; H04W 36/0005; Y02B 60/50
See application file for complete search history.

(56) References Cited

U.S. PATENT DOCUMENTS

| | | | |
|---|---|---|---|
| 3,891,985 A | 6/1975 | Oigarden et al. | |
| 4,209,695 A | 6/1980 | Arnold et al. | |
| 4,278,885 A | 7/1981 | Von et al. | |
| 4,317,993 A | 3/1982 | Hertzog, Jr. et al. | |
| 4,365,154 A | 12/1982 | Arnold et al. | |
| 4,387,302 A | 6/1983 | Givens | |
| 4,499,380 A | 2/1985 | Aggour et al. | |
| 4,851,687 A | 7/1989 | Ettinger et al. | |
| 5,021,664 A | 6/1991 | Hinshaw | |
| 5,068,532 A | 11/1991 | Wormald et al. | |
| 5,076,993 A | 12/1991 | Sawa et al. | |
| 5,098,640 A | 3/1992 | Gozani et al. | |
| 5,239,568 A | 8/1993 | Grenier | |
| 5,241,544 A | 8/1993 | Jasper et al. | |
| 5,521,817 A | 5/1996 | Burdoin et al. | |
| 5,561,434 A | 10/1996 | Yamazaki | |
| 5,712,885 A | 1/1998 | Sowerby et al. | |
| 5,832,379 A | 11/1998 | Mallinckrodt | |
| 5,995,494 A | 11/1999 | Horikawa | |
| 6,018,659 A | 1/2000 | Ayyagari et al. | |
| 6,034,634 A * | 3/2000 | Karlsson | H01Q 3/08 342/354 |
| 6,044,323 A * | 3/2000 | Yee | G08G 5/0013 342/352 |
| 6,061,562 A | 5/2000 | Martin et al. | |
| 6,108,538 A | 8/2000 | Blasiak et al. | |
| 6,144,032 A | 11/2000 | Gazdzinski | |
| 6,256,476 B1 | 7/2001 | Beamish et al. | |
| 6,281,838 B1 | 8/2001 | Hong | |
| 6,513,758 B1 * | 2/2003 | Lloyd | B64G 1/66 244/129.1 |
| 6,594,509 B1 | 7/2003 | Takakusaki et al. | |
| 6,628,941 B2 * | 9/2003 | Knoblach | H04B 7/18576 455/431 |
| 6,718,161 B1 * | 4/2004 | Westall | H04B 7/2041 455/12.1 |
| 6,756,937 B1 | 6/2004 | Chang et al. | |
| 6,856,803 B1 | 2/2005 | Gross et al. | |
| 6,873,301 B1 | 3/2005 | Lopez | |
| 7,095,376 B1 | 8/2006 | Timothy et al. | |
| 7,212,170 B1 | 5/2007 | Dean et al. | |
| 7,777,674 B1 | 8/2010 | Haddadin et al. | |
| 8,078,162 B2 | 12/2011 | Deaton et al. | |
| 8,116,763 B1 | 2/2012 | Olsen | |
| 8,183,999 B1 | 5/2012 | Giallorenzi et al. | |
| 8,190,147 B2 * | 5/2012 | Kauffman | H04L 45/42 370/316 |
| 8,558,734 B1 | 10/2013 | Piesinger | |
| 8,897,770 B1 | 11/2014 | Frolov et al. | |
| 9,100,086 B1 | 8/2015 | Olsen | |
| 9,119,179 B1 | 8/2015 | Firoiu et al. | |
| 9,488,981 B2 | 11/2016 | Pillai et al. | |
| 2002/0061730 A1 | 5/2002 | Hart et al. | |
| 2002/0168974 A1 | 11/2002 | Rosen et al. | |
| 2003/0040274 A1 | 2/2003 | Dai et al. | |
| 2003/0095067 A1 | 5/2003 | Howell | |
| 2003/0223354 A1 | 12/2003 | Olszewski | |
| 2004/0038658 A1 | 2/2004 | Gurelli et al. | |
| 2004/0152480 A1 | 8/2004 | Willars et al. | |
| 2005/0035897 A1 | 2/2005 | Perl et al. | |
| 2005/0107077 A1 * | 5/2005 | Hintermeier | H04W 8/245 455/419 |
| 2005/0108374 A1 | 5/2005 | Pierzga et al. | |
| 2005/0143005 A1 | 6/2005 | Moore, III | |
| 2005/0243005 A1 | 11/2005 | Rafi et al. | |
| 2005/0264438 A1 | 12/2005 | Fullerton et al. | |
| 2006/0009262 A1 | 1/2006 | Hamm | |
| 2006/0063566 A1 | 3/2006 | Maruta | |
| 2006/0238411 A1 | 10/2006 | Fullerton et al. | |
| 2007/0032246 A1 | 2/2007 | Feher | |
| 2007/0090990 A1 | 4/2007 | Nelson | |
| 2007/0184849 A1 | 8/2007 | Zheng | |
| 2007/0224931 A1 * | 9/2007 | Fitton | H04B 7/2606 455/7 |
| 2007/0230419 A1 | 10/2007 | Raman et al. | |
| 2007/0281705 A1 | 12/2007 | Bosenbecker | |
| 2008/0090606 A1 | 4/2008 | Hwang et al. | |
| 2008/0117858 A1 | 5/2008 | Kauffman | |
| 2008/0233865 A1 | 9/2008 | Malarky et al. | |
| 2009/0092072 A1 | 4/2009 | Imamura et al. | |
| 2009/0209277 A1 * | 8/2009 | Pinchas | H01Q 3/005 455/501 |
| 2009/0219912 A1 | 9/2009 | Wengerter et al. | |
| 2009/0295485 A1 | 12/2009 | Mitchell | |
| 2009/0296663 A1 | 12/2009 | Wild | |
| 2010/0085236 A1 | 4/2010 | Franceschini et al. | |
| 2010/0172299 A1 | 7/2010 | Fischer et al. | |
| 2010/0224732 A1 | 9/2010 | Olson et al. | |
| 2010/0273504 A1 | 10/2010 | Bull et al. | |
| 2010/0284377 A1 | 11/2010 | Wei et al. | |
| 2010/0290412 A1 | 11/2010 | Ahn et al. | |
| 2011/0032149 A1 | 2/2011 | Leabman | |
| 2011/0103293 A1 | 5/2011 | Gale et al. | |
| 2011/0122024 A1 | 5/2011 | Eidloth et al. | |
| 2011/0142150 A1 | 6/2011 | Anigstein et al. | |
| 2011/0182230 A1 | 7/2011 | Ohm et al. | |
| 2011/0286325 A1 * | 11/2011 | Jalali | H04B 7/18506 370/221 |
| 2011/0286372 A1 | 11/2011 | Taghavi et al. | |
| 2012/0052828 A1 | 3/2012 | Kamel et al. | |
| 2012/0119953 A1 | 5/2012 | Hosoya et al. | |
| 2012/0150364 A1 | 6/2012 | Tillotson et al. | |
| 2012/0202430 A1 | 8/2012 | Jalali et al. | |
| 2012/0235863 A1 * | 9/2012 | Erdos | H01Q 3/00 342/359 |
| 2013/0040655 A1 * | 2/2013 | Keidar | H01Q 1/245 455/456.1 |
| 2013/0070677 A1 | 3/2013 | Chang | |
| 2013/0109299 A1 | 5/2013 | Roos | |
| 2013/0148570 A1 | 6/2013 | Miller et al. | |
| 2013/0155847 A1 | 6/2013 | Li et al. | |
| 2013/0156021 A1 | 6/2013 | Ashikhmin | |
| 2013/0303080 A1 | 11/2013 | Moreno | |
| 2013/0321204 A1 | 12/2013 | Zahavi et al. | |
| 2013/0331026 A1 | 12/2013 | O'Neill et al. | |
| 2014/0003302 A1 | 1/2014 | Han et al. | |
| 2014/0003394 A1 | 1/2014 | Rubin et al. | |
| 2014/0049643 A1 | 2/2014 | Segerstrom et al. | |

(56) References Cited

U.S. PATENT DOCUMENTS

| | | |
|---|---|---|
| 2014/0073337 A1 | 3/2014 | Hong et al. |
| 2014/0105054 A1 | 4/2014 | Sägrov et al. |
| 2014/0139372 A1 | 5/2014 | Seol et al. |
| 2014/0241239 A1 | 8/2014 | Chang |
| 2014/0335817 A1 | 11/2014 | Hyde et al. |
| 2014/0347223 A1 | 11/2014 | Hyde et al. |
| 2014/0348140 A1 | 11/2014 | Atkinson |
| 2015/0142966 A1 | 5/2015 | Baran et al. |
| 2015/0236779 A1 | 8/2015 | Jalali |
| 2015/0236780 A1 | 8/2015 | Jalali |
| 2015/0236781 A1 | 8/2015 | Jalali |
| 2015/0237569 A1 | 8/2015 | Jalali |
| 2015/0280812 A1 | 10/2015 | Jalali |
| 2015/0301529 A1 | 10/2015 | Pillai et al. |
| 2015/0304885 A1 | 10/2015 | Jalali |
| 2015/0362917 A1 | 12/2015 | Wang et al. |
| 2016/0013858 A1 | 1/2016 | Jalali et al. |
| 2016/0088498 A1 | 3/2016 | Sharawi |
| 2016/0112116 A1 | 4/2016 | Jalali et al. |
| 2016/0134358 A1 | 5/2016 | Jalali et al. |
| 2017/0156097 A1 | 6/2017 | Weber et al. |

FOREIGN PATENT DOCUMENTS

| | | |
|---|---|---|
| EP | 2801838 A1 | 11/2014 |
| JP | 61041979 | 2/1986 |
| WO | WO-2014007873 A2 | 1/2014 |

OTHER PUBLICATIONS

Abbott H., et al., "Land-Vehicle Navigation Using GPS" Proceedings of the IEEE, 1999, vol. 87(1), pp. 145-162.

\* cited by examiner

BROADBAND ACCESS TO MOBILE PLATFORMS USING DRONE/UAV BACKGROUND

PRIORITY AND RELATED APPLICATIONS

This application for patent claims the benefit of priority from U.S. Provisional Application Ser. Nos. 61/940,805, entitled "BROADBAND ACCESS SYSTEM VIA DROVE/UAV PLATFORMS", filed on Feb. 17, 2014 in the name of Ahmad Jalali, and 61/946,575, entitled "BROADBAND ACCESS TO MOBILE PLATFORMS USING DRONE/UAV", filed on Feb. 28, 2014 in the name of Ahmad Jalali, each of the foregoing incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure describes aspects of a system for provisioning broadband internet access to mobile platforms such as vehicles and airplanes, as well as portable devices such as handsets and tablets, using entities such as drones/unmanned aerial vehicles (UAVs) as an access platform to the Internet.

Description of Related Technology

A number of systems for internet access to aircraft have been developed and deployed in recent years. Some of the systems, such as the one provided by Row 44®, are satellite based. These systems have been quite successful in providing connectivity to passengers. The data rate requirements for applications have increased however, and there is a need for much higher data rates and at low cost. New multi-beam satellite systems, primarily deployed in the Ka band, can provide high capacities. Such satellite systems are, however, expensive because of the high cost of the space segment as well as the high cost of the receiving terminal's satellite antennas.

Large dish antennas as large as 0.6 meters in diameter are needed for connectivity to geostationary (or geosynchronous) satellites. Placing such large antennas on vehicles is rather expensive and in most cases not practical. On the other hand, small satellite antennae (suitable for vehicular use) only support low data rates, which would be only adequate for sending short messages (such as used by the trucking industry). Vehicles can connect to internet using cellular systems. However, cellular systems are generally not available in remote areas. Additionally, airplanes (and other fast moving vehicles e.g., trains, etc.) pass through cellular foot prints at speeds that are untenable for operation; a gross amount of time is spent initiating handovers.

Improved solutions are needed for providing higher data rates to airplanes (and other mass transport and/or high speed vehicles). More generally, improved solutions are needed for providing broadband access to mobile platforms. Ideally, such solutions should provide data rates comparable to broadband access under conditions which are otherwise infeasible for existing satellite and cellular solutions.

SUMMARY

The present disclosure describes systems, apparatus and methods for broadband access to mobile platforms using a network of one or more drones or other platforms.

In one aspect of the disclosure, a system is disclosed. In one embodiment, the system includes: at least one antenna fixture on each drone configured to generate at least one beam toward mobile platforms, and dynamically form and steer beams toward specific mobile platforms located in a wide area; at least one radio sub-system on each drone with a receiver configured to demodulate and decode signals received from mobile platforms, and a transmitter configured to modulate data and transmit the modulated signals to mobile platforms through at least one drone antenna, send at least one pilot signal to mobile platforms, control and configure the drone antenna to steer beams in specific directions, and configured to carry out handoff between mobile platforms and drones. In one variant, the system further includes at least one drone switching sub-system configured to switch data received at the drone from one set of mobile platforms to another set of mobile platforms, to switch data received from mobile platforms at the drone to an internet, and to switch data received from the internet to the mobile platforms; an antenna sub-system at the mobile platform configured to dynamically point beams toward specific drones, and configured to adjust its beam in response to mobile platform orientation changes; and a radio sub-system at the mobile platforms configured to demodulate and decode signals received from drones, modulate ground terminal data, and a transmitter configured for transmit the signals to drones through the mobile platforms antenna, send at least one pilot signal to drones, control and configure the mobile platforms antenna to steer its beam in specific direction, configured to determine a need for handoff to a different drone and configured to carry out the handoff, and detect mobile platform orientation changes.

In another embodiment, the system is for providing broadband access to mobile platforms using a network of one or more drones of other platforms, and includes: one or more drones, each drone comprising: at least one antenna fixture configured to provide coverage to one or more mobile platforms; at least one radio sub-system configured to demodulate and decode one or more first signals received from the one or more mobile platforms, the at least one radio sub-system further configured to modulate and transmit one or more second signals to the one or more mobile platforms; a drone switching sub-system configured to switch data received at the each drone to another receiving unit selected from the group comprising: the one or more mobile platforms and the one or more drones; and one or more mobile platforms. In one variant, each mobile platform is configured to: demodulate and decode the one or more second signals received from at least one of the one or more drones corresponding thereto; and modulate and transmit the one or more first signals to the at least one of the one or more drones.

In a second aspect of the disclosure, a mobile platform antenna fixture is disclosed. In one embodiment, the mobile platform antenna fixture includes multiple antenna apertures covering all azimuth directions and low to medium elevation angles, and at least one antenna aperture covering high elevation angles. In another embodiment, a mobile platform radio sub-system that measures drone pilot strength on all antenna apertures, chooses the aperture on which it receives the strongest pilot strength to form a beam toward the drone with which it communicates, and more finely steers the beam, using electronic beam forming, toward the drone with which the mobile platform communicates is also disclosed. Another yet another embodiment, the mobile platform antenna fixture design may be steered mechanically in azimuth and elevation directions, and the beam may be more finely steered in elevation and azimuth using electronic beam forming.

In a third aspect of the disclosure, a mobile platform radio sub-system is disclosed. In one embodiment, the mobile platform radio sub-system monitors changes in the antenna sub-system's orientation in azimuth and elevation using accelerometer/gyroscope instrumentation, measures the drone pilot signal strength, and determines if the mobile platform antenna sub-system's beam needs to be adjusted to compensate for the orientation changes to optimally point to the drone. In one variant, the mobile platform makes an initial approximate adjustment to its beam based on antenna sub-system orientation change estimates from accelerometer/gyroscopes instrumentation. The systems and method to adjust the mobile platform beam further include iteratively making incremental perturbations to the azimuth and elevation of the mobile platform antenna beam boresight, mobile platform radio sub-system making drone pilot strength measurements in each incremental beam position, and the mobile platform processor determining the best beam position among all perturbations.

In a fourth aspect of the disclosure, a handoff mechanism is disclosed. In one embodiment, the handoff mechanism includes the mobile platform obtaining the position location coordinates of the mobile platform, making pilot strength measurements in all angular cones toward drones, sorting the pilots according to their strength, and determining whether a handoff to a different drone with stronger signal is required using knowledge of the mobile platform's position coordinates or the measured drone pilot signal measurements. Once the decision to handoff is made, the mechanism further includes the mobile radio sub-system sending a handoff initiation message to the current drone with which it is communicating and to the handoff candidate drone to which it intends to handoff to, and informing the drones of the time handoff will occur. Furthermore, the current drone and the handoff candidate drone radio sub-systems send a message informing the internet gateway currently serving the mobile platform and the gateway that will serve the mobile platform after handoff and the time handoff will take effect.

In a fifth aspect of the disclosure, systems and methods to provide coverage to mobile platforms that due to obstruction have no visibility to any drone are disclosed. in one embodiment the systems and methods comprise placing a terminal capable of communicating with drones and with mobile platforms on a high altitude location such as a tall building visible to a wide area on the ground. The terminal may, in one variant, consist of multiple antenna fixtures, with at least one antenna fixture forming a beam toward at least one drone, and at least one antenna fixture forming beams toward locations on the ground. In one variant, the terminal receives data from the drone via a first antenna fixture, and forwards the data to a mobile platform, or to a fixed terminal on the ground, via a second antenna fixture, and conversely receives data from the mobile platform, or from a fixed terminal on the ground, via the second antenna fixture and forwards the data to the drone via the first antenna fixture.

In a sixth aspect of the disclosure, systems and methods to provide reliable internet connectivity cost efficiently to portable devices are disclosed. In one embodiment, the systems and methods comprise a terminal consisting of a first radio sub-system capable of communicating with drones is placed in a location that is visible to at least one drone, and with at least one antenna pointed to at least one drone, the terminal consisting of a second radio sub-system capable of communicating with portable devices such as handsets and tablets, and with at least one antenna covering portable devices on the ground. In one variant, the first radio sub-system relays the data received from drone to the second radio sub-system which sends the data to portable devices, and conversely the second radio sub-system relays data received from the portable devices to the first radio sub-system which sends the data to the drone(s). In another variant, the first and second radio sub-systems operate on different frequencies, and the second radio sub-system uses cellular or Wi-Fi wireless communication protocols.

In a seventh aspect of the disclosure, a system configured to enable data communication among a plurality of mobile platforms is disclosed. In one embodiment, the system includes a plurality of antenna disposed on said mobile platforms and configured to communicate via a plurality of antenna disposed on one or more unmanned drones, the unmanned drones being in communication with a data network.

In an eighth aspect of the disclosure, a method for adjusting a mobile platform beam are disclosed. In one embodiment, the method includes: (i) estimating an antenna orientation change; (ii) measuring signal strength from a plurality of communication entities; (iii) determining whether the orientation change exceeds a predetermined threshold; (iv) making one or more adjustments of various size to a beam position; (v) re-measuring signal strength after each of the one or more adjustments; and (vi) selecting the position having the highest signal strength.

In a ninth aspect of the disclosure, a method for transitioning between two communication entities is disclosed. In one embodiment, the method includes: (i) obtaining a location of a receiving entity; (ii) measuring signal strength from a plurality of communication entities within a range of the location of the receiving entity; (iii) determining whether a signal strength of one of the plurality of entities is stronger than a signal strength of a current communication entity; and (iv) sending a handoff message to the current communication entity, the message indicating the one of the plurality of entities having the stronger signal strength.

In a tenth aspect, a drone capable of assisting in provision of broadband data access to one or more mobile apparatus is disclosed. In one embodiment, the apparatus includes: at least one antenna fixture configured to electrically form at least one antenna beam; at least one radio sub-system comprising a receiver configured to demodulate and decode first data received from one or more mobile platform, and a transmitter configured to modulate second data and transmit the modulated second data to at least one of the one or more mobile platforms through the electrically formed at least one antenna beam, and a switching sub-system configured to route decoded first data to an internet gateway, and responsive to reception of second data from the internet gateway associated with the mobile platform, route the second data to the at least one of the one or more mobile platforms.

In an eleventh aspect, a mobile apparatus capable of receiving wireless signals is disclosed. In one embodiment, the apparatus is configured to receive broadband data from one or more drones in communication therewith.

In another aspect, a method of receiving broadband access via a mobile platform is disclosed. In one embodiment, the method includes: determining a location of a drone of a communications drone network based at least in part on a list of drone locations; steering an antenna aperture toward the location of the drone; searching for an optimal beam position within the antenna aperture along a first range of elevation and a second range of azimuth; and electronically forming an antenna beam at the optimal beam position, the electrically formed beam comprising an uplink data stream and a downlink data stream.

In a further aspect, a mobile platform configured to provide broadband access to at least one user is disclosed. In one embodiment, the platform includes: one or more sensors configured to detect one or more mobile platform orientation changes; an antenna sub-system configured to dynamically point beams toward a specific one of a network of drone apparatus, the antenna subsystem further configured to adjust the beams in response to the mobile platform orientation changes; and a radio sub-system configured to demodulate and decode received data.

In a still another aspect, a drone capable of assisting in provision of broadband data access to one or more mobile apparatus is disclosed.

In a fifteenth aspect, a mobile apparatus capable of receiving wireless signals is disclosed. In one embodiment, the apparatus is configured to receive broadband data from one or more drones in communication therewith.

These and other aspects shall become apparent when considered in light of the disclosure provided herein.

DETAILED DESCRIPTION

The figures when taken in conjunction with detailed description are intended to clarify the features and advantages of the present disclosure.

Overview

Embodiments of the present disclosure are directed to provisioning broadband access via a network of communication drones. As used herein, the term "drone" refers to any unmanned robotic platform configured to autonomously operate for extended periods of time. Common examples of unmanned aerial vehicle (UAV) drones include fixed wing aircraft, rotocopters, etc. Drones can operate at significantly lower altitudes than satellites (geo-stationary orbital satellites operate at orbits of approximately 20,000 miles); typical operation for drones occurs from a few thousand feet to several miles. Since drones are closer to the object receiver (e.g., an airplane receiver, mobile handset, etc.) than a satellite would be, it is possible to use much smaller gain antennas than would be needed for communicating with satellites. Smaller gain antennas can be made physically smaller while still supporting substantial data rates. Moreover, satellite connectivity or laying cellular infrastructure is very expensive. Drone systems may be designed to provide connectivity to handsets cost efficiently in areas where existing communications systems are not deployed or where additional capacity is needed.

Exemplary System—

Figure 1:
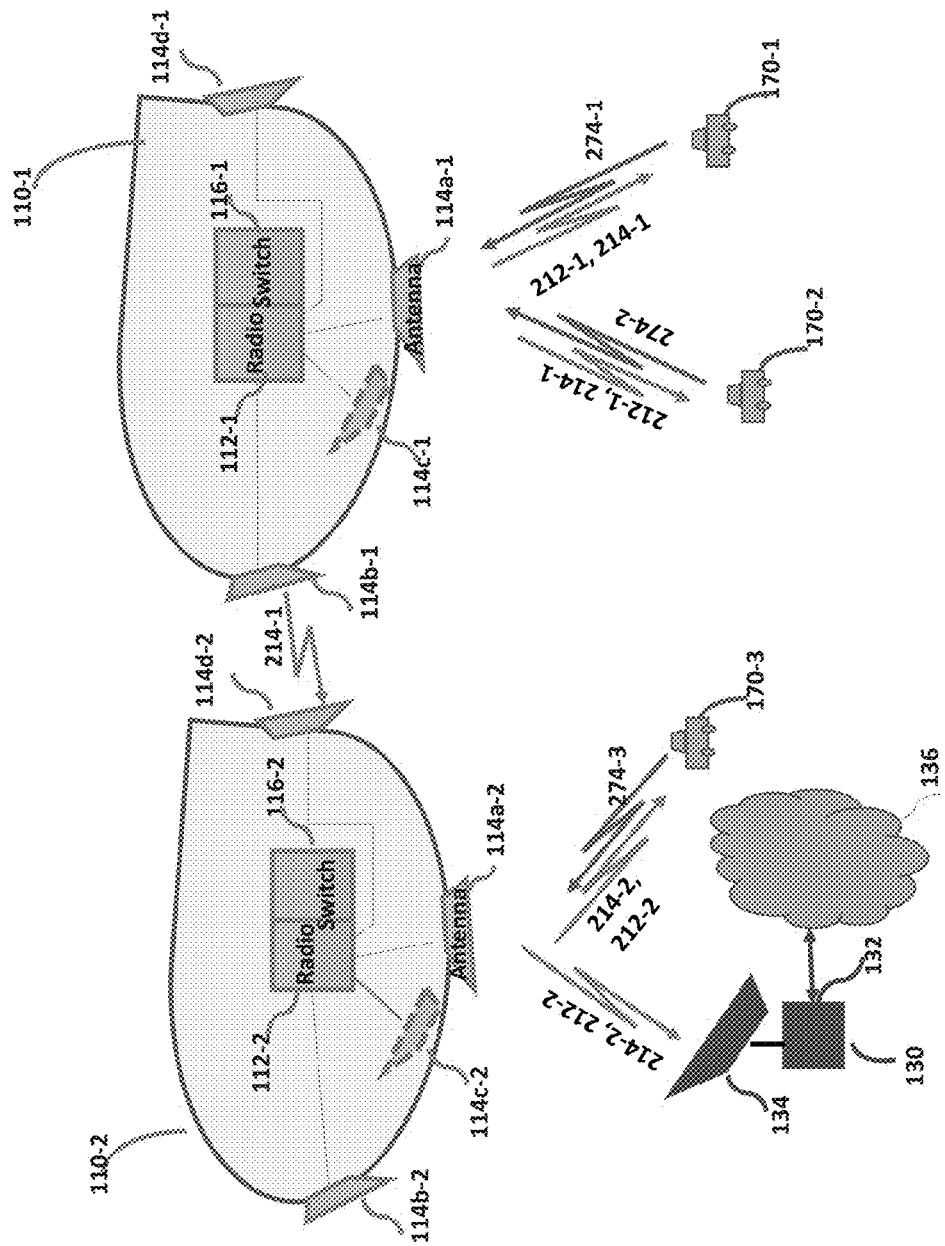
FIG. 1 is a block diagram illustrating an exemplary network of drones configured to provide broadband internet access to vehicles in accordance with one embodiment of the present disclosure.

FIG. 1 illustrates two drones 110-1 and 110-2, however it will be appreciated that the present disclosure may be practiced with any number of drones (including even a single drone), the foregoing being merely exemplary.

In the sequel the suffix-j, where j is an integer, denotes different instances of the same sub-system or component. Each drone 110-j has a drone radio sub-system 112-j, and at least one drone antenna sub-system 114-j.

Exemplary Drone—

Figure 3B:
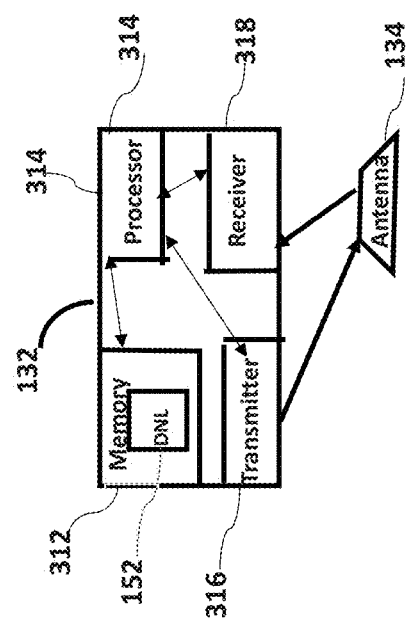
FIG. 3B is a block diagram illustrating one embodiment of an exemplary mobile platform radio sub-system.
Figure 3A:
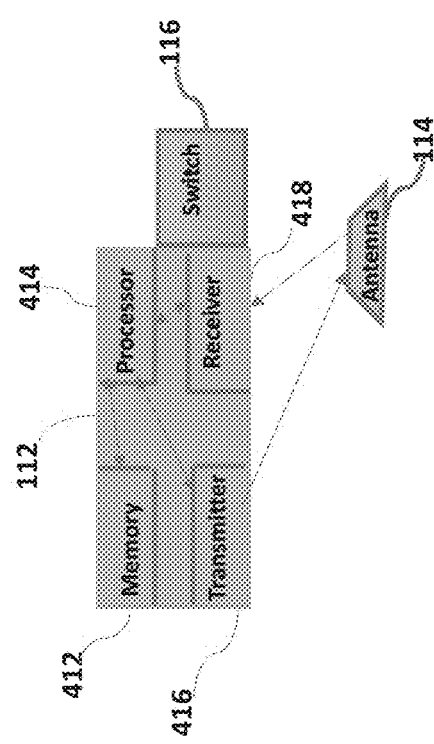
FIG. 3A is a block diagram illustrating one embodiment of an exemplary drone sub-system.

The drone radio sub-system 112-j as illustrated in FIG. 3A comprises 4 radio sub-systems: (i) a receiver 418-j, which demodulates and decodes the signal from antenna sub-systems 114-j; (ii) a transmitter sub-system 416-j, which modulates the data received from processor 414-j and transmits the resulting signal through the antenna sub-system 114-j; (iii) a processor sub-system 414-j, which carries out functions such as configuring the receiver 418-j and transmitter 416-j sub-systems, processing the data received from the receiver 418-j sub-system, determining the data to be transmitted through the transmitter sub-system 416-j, as well as controlling the antenna sub-system 114-j; and (iv) a memory sub-system 412-j, which contains program code (embodied as non-transitory computer readable instructions) and configuration data, and system parameter information that are accessed by the processor 414-j.

The processing sub-system 414-j may include a digital signal processor (DSP), microprocessor, programmable logic device (PLD), gate array, or plurality of processing components as well as a power management sub-system. As used herein, the term "integrated circuit (IC)" refers to any type of device having any level of integration (including without limitation ULSI, VLSI, and LSI) and irrespective of process or base materials (including, without limitation Si, SiGe, CMOS and GaAs). The processing sub-system 414-j may also comprise an internal cache memory that is configured to store computer readable instructions for execution fetched from the memory sub-system 412-j.

The processing sub-system 414-j is connected to a memory sub-system 412-j comprising non-transitory computer media which may for example, comprise SRAM, Flash, SDRAM, and/or Hard Disk Drive (HDD) components. The memory sub-system 412-j may implement one or a more of DMA type hardware, so as to facilitate data accesses as is well known in the art. The memory sub-system 412-*j* is configured to store computer readable instructions for execution by the processing-sub-system 414-*j*. The non-transitory computer readable instructions are configured to cause the processing-sub-system 414-*j* to perform the aforementioned functions of configuring the receiver 418-*j* and transmitter 416-*j* sub-systems, processing the data received from the receiver sub-system 418-*j*, and determining the data to be transmitted through the transmitter sub-system 416-*j*, as well as controlling the antenna sub-system 114-*j*, etc.

The antenna sub-system 114-*j* may include a wide variety of filters, amplifiers, analog-to-digital converters (A/D), digital-to-analog (D/A) converters (including e.g., direct or delta-sigma converters), mixers, multiplexers, duplexers, diplexers, etc. Due to the very specific nature of RF reception, each antenna sub-system 114-*j* is generally adapted to a very limited range of operation.

In some instances, multiple antenna sub-systems 114-*j* may be required for different radio frequencies, and or radio access technologies (RATs). Antenna sub-systems may be further classified according to the number of input (receive) and output (transmit) streams they provide. The most common examples are MIMO (Multiple Input Multiple Output), SISO (Single Input Single Output) configurations, although other configurations may be used as well. It is readily appreciated that in some embodiments, the antenna sub-systems 114-*j* may support any combination of MIMO, SIMO, MISO, and SISO antennas.

The receiver 418-*j* and transmitter 416-*j* sub-systems may be configured according to any radio access technology. In some embodiments, the radio access technology may be based on an existing communication protocol such as without limitation, a cellular or satellite communications technology. In still other embodiments, the radio access technology may be specialized or otherwise proprietary. Common examples of cellular radio technologies include without limitation: Universal Mobile Telecommunications Systems (UMTS), Long Term Evolution (LTE) (and its variants), CDMA 2000, etc. Access technologies may be based on time division multiple access (TDMA), frequency division multiple access (FDMA), code division multiple access (CDMA), orthogonal frequency multiple access (OFDMA), etc. Artisans of ordinary skill in the related arts, given the contents of the present disclosure, will readily appreciate the wide variety of possible radio technologies applicable to the described applications.

The receiver 418-*j* and transmitter 416-*j* sub-systems are configured to communicate with corresponding transceivers located at e.g., mobile terminals (mounted on vehicles, standalone, and/or handheld, etc.), other drones, and ground terminals. In some cases, each communications link may be further distinct in frequency, time, spreading codes, etc. For example, a first link from a drone to a ground terminal may be conducted one or more first frequency bands, a second link from a drone to a handset may be conducted via one or more second frequency bands, and a third link from a drone to another drone may be conducted via one or more third frequency bands.

As is also illustrated in FIG. 3A, each drone also has a drone switching sub-system 116-*j*. The switching sub-system 116-*j* routes data received from one transceiver to another transceiver in the coverage space of the drone; for example, as shown, vehicle 170-1 and vehicle 170-2 in the coverage space of drone 110-1 can send data to each other. If a transceiver's data is destined for external network access (e.g., the internet) then the drone switching sub-system routes data to a gateway, and the gateway routes the data to the external network. For example, in FIG. 1 when vehicle 170-3 sends its data to drone 110-2, drone 110-2 forwards the data to gateway 130, which in turn sends the data to internet 136.

Those of ordinary skill in the related arts will readily appreciate that the data may be packet-switched or circuit-switched. Packet switched data delivery is based on delivery of "packetized" data which can support variable bit-rate data streams. When traversing a network, the packets can be buffered and queued, resulting in variable delays and throughput depending on the network's capacity and the traffic load on the network. In contrast, circuit switched data delivery establishes a dedicated connection of constant bit rate and constant delay between nodes for exclusive use during the communication session.

It is further appreciated, that data may traverse multiple "hops" between a source and destination. For example, as previously noted, a handset may transmit data to a first drone, the first drone may transmit the data to one or more intermediary drones within the network. Subsequently thereafter, at least one of the intermediary drones may transmit the data to a ground terminal which is connected to a gateway. In another such example, a handset may transmit data to a first drone, the first drone may transmit the data to one or more intermediary drones within the network and subsequently thereafter at least one of the intermediary drones may transmit the data to another handset. One common example of network routing technology that supports hop based routing is TCP/IP, although it will be appreciated that other network technologies may be used with equal success.

In particular one exemplary embodiment of the present disclosure is directed to the use of a network of drones to provide support via drone-to-drone hops over long expanses. For example, in one exemplary embodiment, a network of drones can provision network connectivity over the ocean for e.g., transcontinental flights and/or ocean-liners (freight tracking, crew connectivity, and/or passenger connectivity). For example, a cruise ship passenger attempts to access a website (or otherwise connect to the internet), the passengers query is bounced from drone-to-drone over the ocean, to a land-based ground terminal operating as a gateway. In this manner, the passenger has connectivity under circumstances which pose significant challenges for other connectivity technologies (e.g., satellite connections offer very low data rates or high costs and cellular networks lack sufficient range). Moreover, those of ordinary skill in the related arts will readily appreciate the significance of the present disclosure with respect to providing connectivity to e.g., under-developed areas, remote locations, polar ice caps, deserts, etc.

Figure 2:
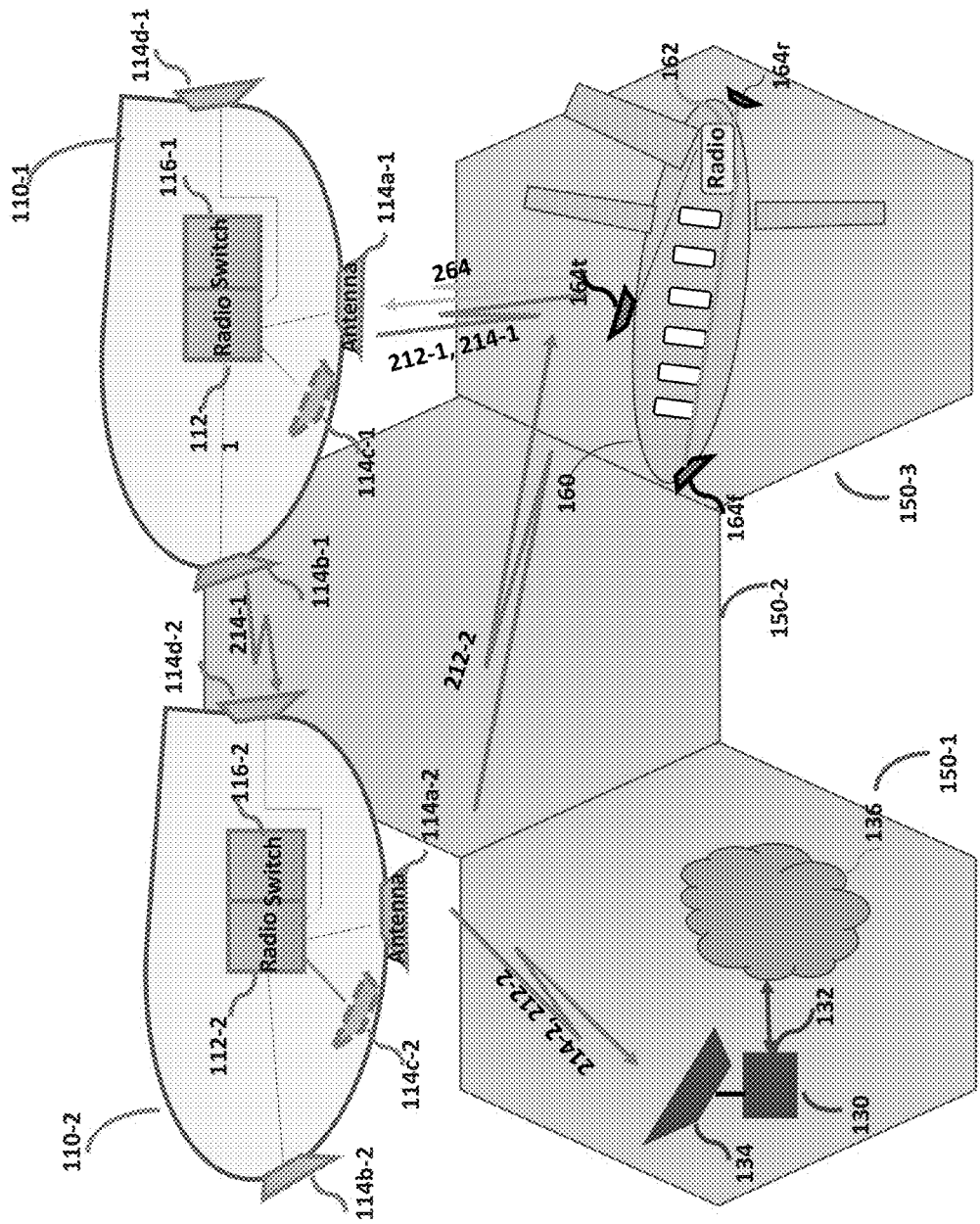
FIG. 2 is a block diagram illustrating a second exemplary network of drones configured to provide broadband internet access to airplanes in accordance with another embodiment of the present disclosure.

In one exemplary embodiment, each drone sends a pilot signal, 212-1 and 212-2 (as illustrated in FIGS. 1 and 2), which may be received by all mobile platforms in the coverage space of the drone. Those of ordinary skill in the related arts will readily appreciate that the term "foot print" generally refers to a coverage area on land. In contrast, it is appreciated that a drone may readily simultaneously service receivers in three dimensional (3D) spaces. For example, a drone may simultaneously service an airplane flying overhead and a car driving beneath. In one variant, the drones divide their coverage space into smaller areas, referred to herein as "cells", such as cells 150-1, 150-2 and 150-3 illustrated in FIG. 2. Drones form beams that cover each cell when sending pilot signals or data to mobile or fixed platforms in a given cell.

A number of approaches may be utilized to enable the drones to transmit pilot signals in all cells in a way which avoids having pilots in adjacent cells from causing interference to each other (such as at the cell boundaries). In one exemplary approach, a pilot signal is sent in a time slot reuse manner, whereby the pilot is sent in adjacent cells in different time slots in order to avoid interference at the boundary of the cells. In another approach, the pilot signal in adjacent cells is sent on different frequencies to avoid interference at cell boundaries, i.e. a frequency reuse scheme. One frequency or time slot reuse example comprises using different time slots or frequencies in each of 3 adjacent cells. Yet other multiple use/access approaches will be recognized by those of ordinary skill given the present disclosure.

In one exemplary embodiment, the drone radio sub-system 112-j as illustrated in FIG. 3A may be implemented on an unmanned aerial vehicle (UAV). The drone may include one or more propulsion systems, one or more fuel systems, and onboard navigational and control systems. In one exemplary embodiment the drone comprises a fixed wing fuselage in combination with a propeller, etc. In other embodiments, the UAV comprises a rotocopter (propelled by a rotor). The UAV may carry fuel onboard or derive its energy from its environment (e.g., wind, solar, thermal, etc.). Existing solutions typically use an internal combustion engine, Wankel rotary engine, and/or electrical motor. Existing UAV drones have the capability to stay up in the air for hours, days and even weeks at a time without refueling.

While the disclosed embodiments are described with respect to UAVs, it should be appreciated by those of ordinary skill in the related arts that drones are by no means limited to aerial operation; drones may include watercraft, land-based vehicles, submersibles, and even spacecraft variants, such implementations being within the skill of an ordinary artisan, given the contents of the present disclosure.

The navigational system may include sensor apparatus to determine the drone's positioning. Positioning may be based on e.g., global positioning system (GPS), radar, beacons etc. The drone may also sense its own altitude, pitch, yaw, roll, rate of movement, etc. The various positioning information may be used by internal navigation systems to adjust its current course, maintain its current course, set a new course, etc. Moreover, it is appreciated that in some cases, the drone may be able to switch between automatic pilot mode and a manually piloted mode (where a remote operator can fly the drone e.g., to manually reposition the drone, to land the drone, etc.).

In one envisaged route, the navigational system is configured to allow the drone to maintain a substantially constant position (e.g., flying in circles, figure eights, clovers, etc.). In other routes, a number of drones may each patrol a territory during service. In still other cases, the drones may simply circulate along a pre-defined path. Those of ordinary skill in the related arts, given the contents of the present disclosure, will readily appreciate the myriad of possible route/flight patterns that a drone may use.

Exemplary Gateway—

Referring now to FIG. 3B an exemplary gateway 130 comprises an antenna system 134 and a radio sub-system 132. The gateway radio sub-system 132 is comprised of: a receiver sub-system 318-j, a transmitter sub-system 316-j, a processor sub-system 314-j and a memory sub-system 312-j.

The processing sub-system 314-j may include a digital signal processor (DSP), microprocessor, programmable logic device (PLD), gate array, or plurality of processing components as well as a power management sub-system.

The processing sub-system 314-j may also comprise an internal cache memory that is configured to store computer readable instructions for execution fetched from the memory sub-system 312-j.

The processing sub-system 314-j is connected to a memory sub-system 312-j comprising non-transitory computer media which may for example, comprise SRAM, Flash, SDRAM, and/or Hard Disk Drive (HDD) components. The memory sub-system 312-j may implement one or more of DMA type hardware, so as to facilitate data accesses as is well known in the art. The memory sub-system 312-j is configured to store computer readable instructions for execution by the processing-sub-system 314-j. The non-transitory computer readable instructions are configured to cause the processing-sub-system 314-j to perform the functions of configuring the receiver 318-j and transmitter 316-j sub-systems, processing the data received from the receiver sub-system 318-j, and determining the data to be transmitted through the transmitter sub-system 316-j, as well as controlling the antenna sub-system 134-j, etc.

The receiver 318-j and transmitter 316-j sub-systems may be configured according to any radio access technology. In some embodiments, the radio access technology may be based on an existing communication protocol such as without limitation, a cellular or satellite communications technology. In still other embodiments, the radio access technology may be specialized or otherwise proprietary. Artisans of ordinary skill in the related arts, given the contents of the present disclosure, will readily appreciate the wide variety of possible radio technologies applicable to the described applications.

The receiver 318-j and transmitter 316-j sub-systems are configured to communicate with corresponding drone transceivers.

The processor sub-system 314-j is further configured to route traffic received from one or more drones, to another external network (e.g., the internet), and vice versa. In some embodiments, the gateway may be required to perform address resolution between subnets, protocol translation, etc.

Exemplary Mobile Transceiver—

An exemplary mobile transceiver may be implemented on a myriad of types of devices. In one embodiment, the mobile transceiver is configured to service to a plurality of users. In one such exemplary embodiment, a mobile transceiver operates as a "backhaul connection" for a wireless local area network (WLAN) aboard a passenger aircraft, cargo or cruise ship; passengers connecting to the WLAN can access the internet (via the drone network backhaul). In particular, those of ordinary skill in the related arts will appreciate that a network of drones patrolling over the ocean can provide connectivity to passing ships and planes cheaply and more efficiently than existing solutions (e.g., satellite based connectivity). Moreover, it is appreciated that systems may be adapted for use by consumer devices (e.g., handheld equipment, in-car systems, etc.)

Similar to gateway sub-systems, mobile transceivers, have two main sub-systems: a radio sub-system, and an antenna sub-system. Each mobile transceiver radio sub-system comprises 4 sub-systems: (i) a receiver, which demodulates and decodes the signal from antenna sub-systems; (ii) a transmitter sub-system, which modulates the data received from processor and transmits the resulting signal through the antenna sub-system; (iii) a processor sub-system, which carries out functions such as configuring the receiver and transmitter sub-systems, processing the data received from the receiver sub-system, determining the data to be transmitted through the transmitter sub-system, as well as controlling the antenna sub-system; and (iv) a memory sub-system, which contains program code and configuration data, and system parameter information that are accessed by the processor.

The processing sub-system may include a digital signal processor (DSP), microprocessor, programmable logic device (PLD), gate array, or plurality of processing components as well as a power management sub-system. The processing sub-system 314-*j* may also comprise an internal cache memory that is configured to store computer readable instructions for execution fetched from the memory sub-system.

The processing sub-system is connected to a memory sub-system comprising non-transitory computer media which may for example, comprise SRAM, Flash, SDRAM, and/or Hard Disk Drive (HDD) components. The memory sub-system may implement one or a more of DMA type hardware, so as to facilitate data accesses as is well known in the art. The memory sub-system is configured to store computer readable instructions for execution by the processing-sub-system. The non-transitory computer readable instructions are configured to cause the processing-sub-system to perform the functions of configuring the receiver and transmitter sub-systems, processing the data received from the receiver sub-system, and determining the data to be transmitted through the transmitter sub-system, as well as controlling the antenna sub-system, etc.

The receiver and transmitter sub-systems may be configured according to any radio access technology. In some embodiments, the radio access technology may be based on an existing communication protocol such as without limitation, a cellular or satellite communications technology. In still other embodiments, the radio access technology may be specialized or otherwise proprietary. Artisans of ordinary skill in the related arts, given the contents of the present disclosure, will readily appreciate the wide variety of possible radio technologies applicable to the described applications.

The receiver and transmitter sub-systems are configured to communicate with corresponding drone transceivers.

It is appreciated that different capacity and antenna requirements for mobile transceivers, may result in substantially varied software and/or hardware requirements. For instance, the antenna sub-system of a passenger aircraft would typically need to support a large number of passengers, and would require higher bandwidth capabilities than an in-car system (presumably supporting one or two users). Additionally, systems which may need to connect over longer distances (e.g., at sea, etc.) may have higher gain requirements. Other common considerations that are likely to affect designs include e.g., power consumption, processing capability, cost of components, reliability of the link (e.g., service level agreement (SLA) or quality of service (QOS)), reliability of the components (e.g., radiation tolerance, thermal tolerance), etc.

Referring back to FIG. 1, each drone has a number of antenna fixtures placed in front, in the back, and on sides of the drones. Utilization of the multiple antenna fixtures enables a mobile transceiver (e.g., an airplane, vehicle, handset, etc.) to be anywhere in a semi-hemispherical area around the drone. In order to receive the strongest signal and achieve the highest data rate, the mobile transceiver would ideally communicate with the drone to which the mobile transceiver is closest. Since, the mobile transceiver and the drone may be in different orientations with respect to each other and multiple antennas are provided on the drone to ensure visibility to the mobile transceiver. It will also be appreciated that these antennae may be configured in MIMO (Multiple Input, Multiple Output) or other similar arrangement in order to, inter alia, optimize transmission/reception.

Moreover, as is discussed in co-owned U.S. Provisional Patent Application Ser. No. 61/940,805; entitled "BROADBAND ACCESS SYSTEM VIA DROVE/UAV PLATFORMS", filed on Feb. 17, 2014 and which is incorporated herein by reference in its entirety, the drone communication system is composed of an antenna sub-system, a radio sub-system and a data switching sub-system. The mobile platform comprises antenna and radio sub-systems capable of communicating with the drones, detecting changes in the mobile platform's azimuth and elevation changes, and adjusting the mobile platform's antenna beam to compensate for the orientation changes to optimally point toward the drones. The drones communicate with ground terminals and must provide coverage to a wide area; in particular the drones and ground terminals must be able to communicate in 360° azimuth and from low elevation angles (e.g., nearly 2°) to high elevation angles (e.g., as high as 90°).

In another example (illustrated in FIG. 2), an airplane comprises at least one antenna 164 in order to communicate with drones that are at higher altitude than that of the airplane. In one exemplary embodiment, the antenna 164*t* on top of the airplane may be utilized for this purpose. Additionally, two more antenna may further be utilized on the airplane to communicate directly with ground stations and/or other airplanes. In one example, these antenna comprise a front antenna 164*f*, and a rear antenna 164*r*. Moreover, the airplane's elevation angles to drones that are distant from the airplane may be as low as a few degrees of elevation. Therefore, antennas in front and in back of the plane may be further utilized to cover low elevation angles from airplane to drones.

For mobile platforms, the internet may be reached through the drone network via first acquiring the drone from which the mobile platform receives the strongest signal (or which otherwise has the most desirable properties, which may or may not include an evaluation of signal strength), hereinafter referred to as the "best" drone. One approach to finding the best drone is described herein. The mobile platform determines its own location using information provided by e.g., a global positioning system (GPS) system, or similar location determination scheme. In some embodiments, the mobile platforms may additionally have access to location coordinates of one or more of the drones in the network. The radio sub-system of mobile platforms additionally has a list of drones that are in the first tier of drone network around the mobile platform, referred to as the Drone Neighbor List (DNL). In one variant, the DNL sorts the drones according to the decreasing pilot strength received from each drone in Line of Sight (LOS) conditions.

In some cases, the mobile platform may have drone location information preloaded (e.g., based on known schedules, etc.). In other cases, the mobile platform may receive drone location information dynamically from e.g., other drones, network services, etc. In some cases, this information may be broadcast via a control channel. For example, a drone network may periodically broadcast update information regarding the location of its constituent drones. In one such example, a drone may broadcast the locations of its neighboring drones. This broadcast information may be useful to mobile platforms for handoffs and/or to assist other drones when routing drone-drone traffic. In other embodiments, the mobile platform must receive this information via out-of-band services. For example, a cellular network may provide limited roaming services via drones; just before a mobile platform enters a coverage hole (based on fading reception quality and location proximity), drone coverage information is pushed to the mobile platform. This drone coverage information is stored to memory for use once reception is lost. In still other embodiments, the mobile platform may have drone coverage information stored ahead of time based on known paths (for example, an airplane flight with a known trajectory can pre-store a list of known drones along the flight path).

Common examples of drone information may include: location, trajectory information, traffic information (e.g., to determine whether the drone can support another user), capabilities information (e.g., to determine whether the drone supports the user's desired applications), historic performance information, synchronization assistance information (e.g., depending on implementation, drones may have slight time base differences), etc.

In one embodiment, the mobile platform's radio sub-system initially points its antenna beam toward the "best" drone according to the DNL, and measures the strength of the pilot signal being transmitted by the drone. If there is no obstruction between the mobile platform and the drone to which the mobile platform is pointing its beam, then the measured drone pilot signal strength will be close to the LOS value on the DNL list. In that case, the mobile platform chooses the drone to communicate with and sends a registration message to this drone. However, if there is an obstruction between the drone and the mobile platform, then the mobile platform searches for a pilot signal from the next drone on the DNL. In this manner, the mobile platform searches and measures the pilot strength of the drone pilots on the DNL, and chooses the drone from which it receives the strongest pilot.

Additionally, the mobile platform's radio sub-system is equipped with instruments such as a compass and a level finder to measure the orientation of the mobile platform's antenna sub-system caused by the mobile platform's turn, terrain topology, and roll/pitch/yaw of the airplane. Therefore, before steering the mobile platform's beam toward a given drone location, the radio sub-system may make estimates of the corresponding antenna sub-system orientation.

In another approach to finding the best drone, the mobile platforms divide the space around them into angular cones or sectors that cover the whole space between the mobile platform and the drones. According to this embodiment, each mobile platform points a beam toward the area covered by one of the cones and searches for all possible drone pilots in that direction, and measures the strength of the detected drone pilots for each position of the mobile platform beam. Such a search strategy may be especially useful where the mobile platform does not have information regarding drone position. Once all beam positions/cones have been searched, the mobile platform's radio sub-system chooses the beam position and the drone that provides the strongest pilot signal. For instance, in FIG. 2, the drones 110-1 and 110-2 send pilot signals 212-1 and 212-2 which are received by plane's antenna sub-system 164t. The airplane radio sub-system 162 determines that pilot signal 212-1 is stronger and sends a registration message 264 to drone 110-1 to establish a link with drone 110-1.

It is further appreciated that vehicles travel on inclines and make turns, thus requiring real time adjustment to the vehicle antenna's beam. Airplanes also make turns along their routes, and even along a given route the airplanes go through roll, pitch and yaw motions. Therefore, the antenna fixture on the vehicle and the airplane is designed to steer its beam dynamically as the vehicle and/or airplane makes turns, or changes orientation. The antenna beam steering may be done mechanically or electronically.

Figure 4B:
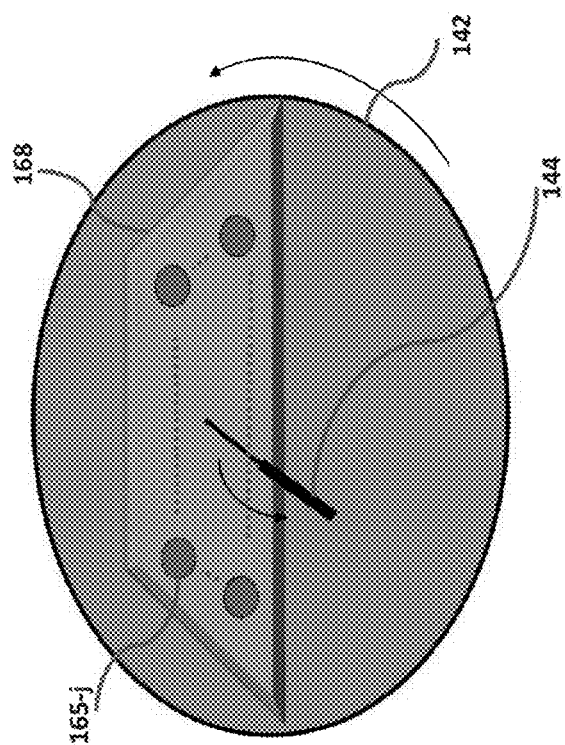
FIGS. 4A and 4B are block diagrams illustrating various alternative aircraft antenna fixtures.
Figure 4A:
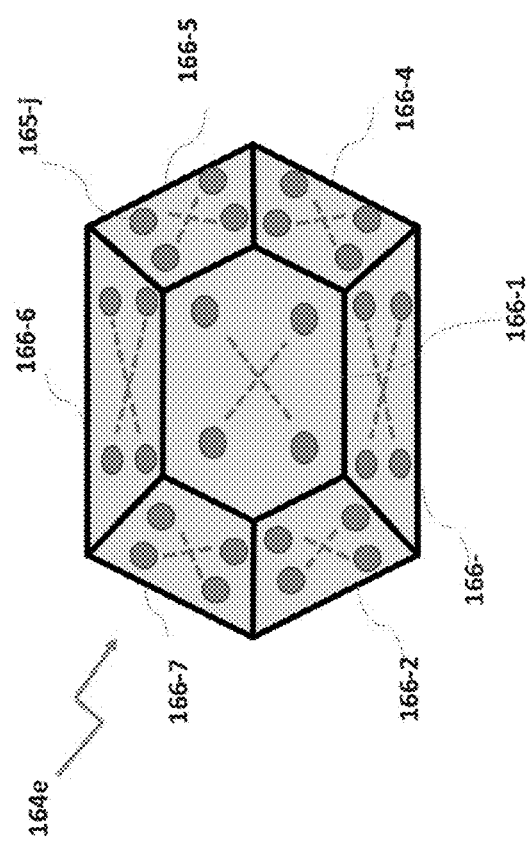

FIG. 4A illustrates an antenna fixture that can form beams electronically in 360° in azimuth and in upper hemisphere. The illustrated example comprises seven (7) apertures 164-1 through 164-7, however it is appreciated that any number may be utilized consistent with the present disclosure. An aperture on top may be utilized specifically to cover high elevation angles, whereas the other apertures (such as on the sides or disposed elsewhere) cover mid to low elevation angles.

Each aperture is comprised of a number of antenna elements 165-$j$, where $j$ is an integer denoting different instantiations of the antenna element. The advantage of electronic beam forming is that the beam may be steered quickly. An antenna fixture that also relies on mechanical steering may be designed to have a larger part of the aperture visible toward the drone as illustrated in FIG. 4B.

FIG. 4B further illustrates a trapezoidal aperture as one example of an aperture that may fit under an aerodynamically conformal radome, which is deployed on an airplane or a vehicle. The aperture may be shaped differently to fit under the radome while having the largest surface area. The aperture 168 of FIG. 4B is comprised of antenna elements 165-$j$, $j$ an integer denoting different instances of the antenna element. The antenna aperture 168 may be steered mechanically in azimuth direction using the exemplary circular disk 142 on which the aperture is installed.

FIG. 4B also illustrates a structure 144 which is attached to the aperture and is designed to move the aperture in elevation angles. For instance, to cover large elevation angles close to 90° from horizon, the aperture may be moved to a flat position on the circular base. On the other hand, in order to cover very low elevation angles the aperture 168 may be placed in an almost vertical position. Once the aperture is positioned to be able to steer its beam toward the desired azimuth and elevation angle, then the antenna elements 165-$j$ may be used to electronically refine the beam toward the desired location. Note that the beam may be steered toward the desired drone solely using mechanical means. In other words, one antenna fixture solution option may rely solely on mechanical steering in two axes without any electronic beam forming in order to simplify the electronics.

Beam Adjustments—

Next, exemplary systems and methods used to determine that the mobile platform antenna beam must be adjusted are described.

In one embodiment, the above-described scheme configured to find and track the best drone by only using the position coordinates of the drones and of the mobile platform is utilized. As discussed above, the vehicle/airplane radio sub-system is equipped with instruments such as a compass and a level finder to measure the orientation of the vehicle/airplane antenna sub-system during the initial best drone determination step. Note that once the best drone has been determined and communication with drone has been established, the mobile platform radio sub-system continuously monitors changes in the mobile platform's orientation and steers the beam toward the location of the drone. One approach to monitoring changes in the vehicle/airplane orientation is to use accelerometer/gyroscopes. Once the accelerometer/gyroscope readings indicate a need for adjusting the mobile platform beam, then the mobile platform radio sub-system adjusts the beam according to the change in mobile antenna orientation as measured by accelerometer/gyroscope. One advantage of utilizing the best drone determination scheme where the mobile platform forms beams in different angular cones and searches for all possible drones is robustness to changes on the mobile platform's orientation and terrain data.

In some embodiments, the mobile platform may use its internal measurements (e.g., accelerometer/gyroscope, trajectory, etc.) in conjunction with drone information (e.g., location, trajectory, etc.) to adjust the beam. In some cases, the beam adjustment may be rough, and require further fine tuning based on e.g., actually measured signal strength, reception quality, etc.

Those of ordinary skill in the related arts will readily appreciate (given the contents of the present disclosure), that the received drone pilot strength is directly related to the degree of alignment between the drone and the mobile platform. Therefore, when the mobile platform antenna is misaligned with the drone, the smaller received drone pilot strength indicates the mobile platform beam is not optimally pointing toward the drone. Therefore, another approach to determining whether the mobile platform orientation has changed may comprise continuously measuring the drone pilot signal. When the received drone pilot strength drops by more than a predetermined threshold amount, then the mobile platform radio sub-system decides that its beam needs to be adjusted. In order to adjust the mobile platform's beam optimally toward the drone, the radio sub-system starts from the current beam position and perturbs the beam's boresight incrementally in elevation and azimuth angles using mechanical or/and electronic beam steering, and makes drone pilot strength measurements for each perturbation. Using the changes in pilot strength measurements as a function of the different incrementally changed beam boresight positions, the mobile platform radio sub-system determines the beam position perturbation that receives the strongest pilot signal from the drone from among the set of measurements, and chooses the beam position as the new current beam position. Next, the radio sub-system starts from the new current beam position, and repeats the mobile platform beam perturbation and drone pilot signal strength measurement step to further optimize the beam position and adapt the beam position to changes in mobile platform's orientation change. This scheme does not rely on direct measurement of mobile platform orientation change.

Note that the radio sub-system may further use the accelerometer/gyroscope as well as changes in received pilot strength to determine if there is a need to adjust the beam. For instance, when there is a significant drop in the measured drone pilot signal strength, or a significant orientation change as measured by accelerometer/gyroscope, then the radio sub-system may make a first large but approximate correction to the mobile platform's beam position toward drone based on orientation change estimate, followed by subsequent small perturbations as described above to further fine tune the beam's position and adapt to smaller changes in mobile platform's movements.

Figure 8:
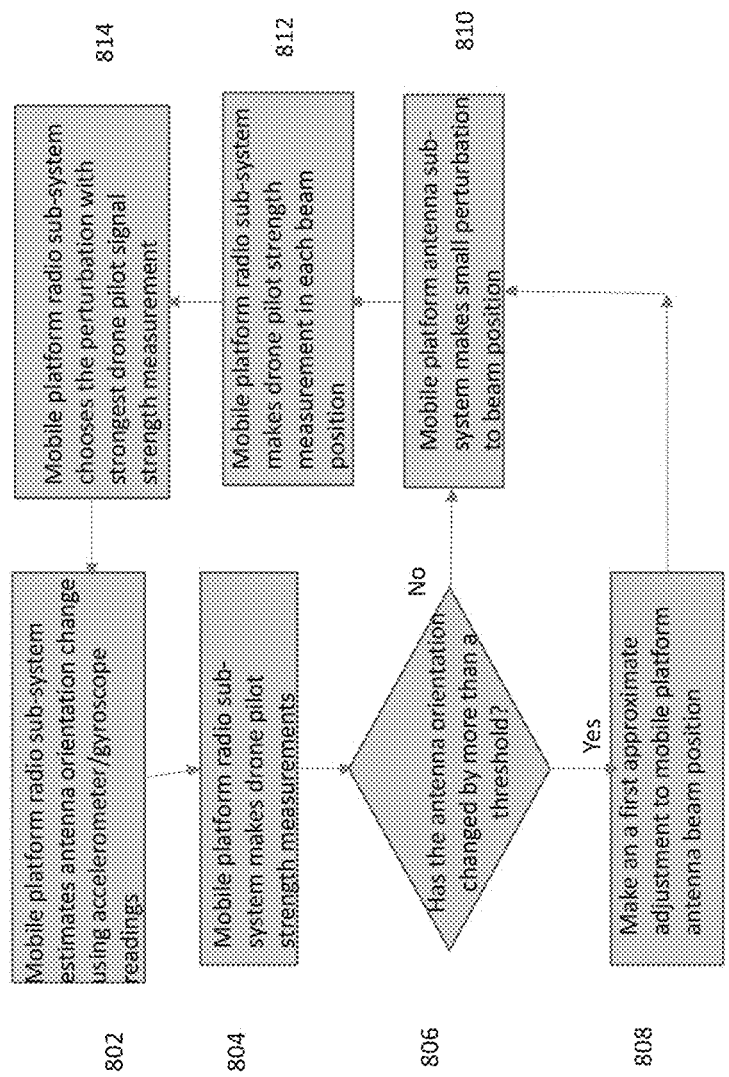
FIG. 8 is a logical flow diagram illustrating an exemplary process for adjusting the mobile platform beam in response to changes in mobile platform's orientation.

FIG. 8 illustrates an exemplary method for adjusting the mobile platform beam in response to changes in the platform's orientation.

As shown, per step 802, the mobile platform radio sub-system estimates of the changes in orientation using accelerometer/gyroscope instrumentation. In step 804, the radio sub-system estimate changes in pilot strength received from the serving drone. In step 806, the mobile platform radio sub-system determines if a large enough change in orientation has occurred that a first rough change to the beam position is necessitated. If the change is larger than a predetermined threshold, the process moves to step 808 to make a first approximate change to the beam position. Per step 810, the mobile platform radio antenna sub-system then makes small perturbations to the azimuth and elevation positions of the beam. In step 812, the radio sub-system makes pilot strength measurements for each perturbed antenna beam position. Finally, in step 814, the radio sub-system chooses the beam position with strongest pilot strength.

In one exemplary embodiment, beam steering for the antenna fixture of FIG. 4A is done in two steps. If the change in the mobile platform is large enough, then there may be a need to switch the antenna aperture that is currently used to form a beam toward the drone. Therefore, in the first step the mobile platform radio sub-system determines whether the current antenna aperture is the right aperture given changes in the mobile platform's orientation. Once the right aperture to use is identified, then the next step is to adjust the beam toward the drone either using accelerometer/gyroscope information or by an iterative beam perturbation scheme (such as that described above).

The antenna fixture of FIG. 4B has both mechanical and electronic beam steering capability, thus adjustments are first made to the azimuth and elevation mechanical position of the beam to find an approximate beam position using accelerometer/gyroscope information. Next, the beam is adjusted more finely using electronic beam steering. For example, the beam perturbation approach described above may be utilized. If the antenna fixture of FIG. 4B does not have any electronic beam steering capability, then the beam fine tuning may also be achieved by making small perturbations to the antenna aperture position in azimuth and elevation using the mechanical fixtures such as 142 and 144. Next, drone pilot strength measurements are made for each perturbation, and the aperture position with strongest received pilot signal strength measurement is chosen for the new current beam position.

Handoff—

Systems and methods to detect a need for handoff to a different drone, and executing the handoff are now described.

Figure 5:
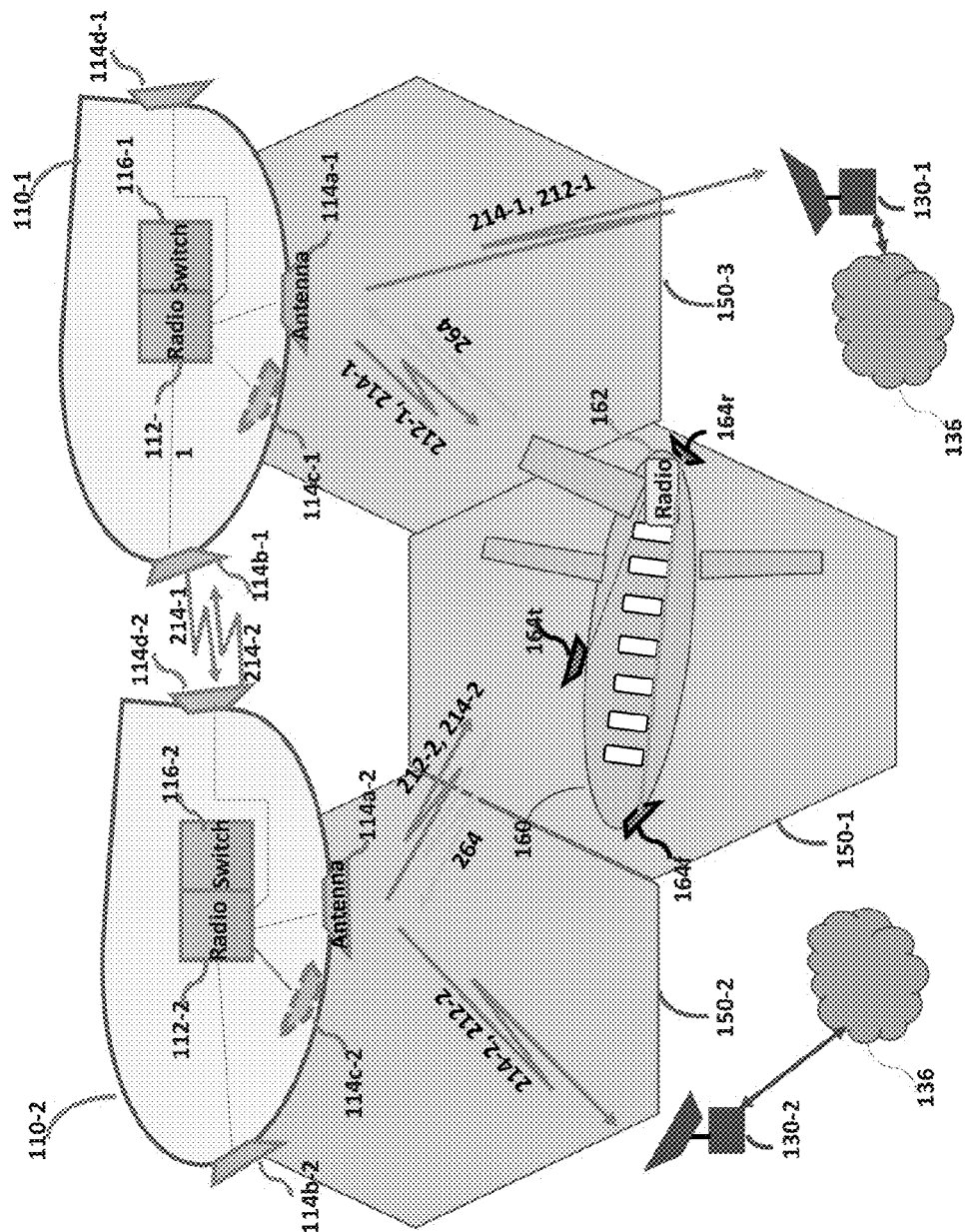
FIG. 5 is a block diagram illustrating an exemplary aircraft (e.g., airplane) during handoff between two drones.

As the mobile platform travels along its route, its radio sub-system keeps track of the platform's position relative to the drones and may initiate a handoff to a second drone based on the position of the platform. The mobile platform radio sub-system also periodically measures pilot signals from a list of neighboring drones, referred to as DNL (Drone Neighbor List). As described above, each drone divides the coverage area in its coverage space into cells and periodically transmits a pilot signal in each cell. FIG. 5 illustrates an airplane 160 as it travels between coverage areas of two drones 110-1 and 110-2. Three drone cells 150-1, 150-2 and 150-3 are shown in FIG. 5. Each mobile platform also divides the coverage area between it and each drone into angular cones, and periodically searches for drone pilot signals in each cone. The airplane 160 communicates with the drone 110-1 as it travels toward an area covered by drone 110-2. The airplane radio sub-system 162 measures pilot signals 212-1 and 212-2 received from drones 110-1 an 110-2, ranks the strength of the pilot signals from different drones, and based on the relative strength of the different drone pilot signals to determine whether a handoff to another drone (such as drone 110-2) is needed.

As a brief aside, "handoff" or "handover" refers to the technique of transferring an ongoing call or data session from one channel to another channel. Within the context of the present disclosure, handoffs can occur between drones (e.g., a terminal serviced from a first drone switches to a second drone) and/or between drones and gateways (e.g., a terminal serviced from a first drone to a gateway). In some cases, the handoffs may occur between technologies e.g., handoffs between a drone and a cellular base station or a Wi-Fi access point, etc. (similar to existing inter-radio access technology (Inter-RAT)) capabilities. Various other techniques for handoff will be recognized by those of ordinary skill in the related arts, given the contents of the present disclosure.

In general, pilot signals from multiple drones are measured and a drone handoff candidate is chosen based on the relative strength of all measured drone pilot signals. Once airplane radio sub-system 162 has determined that a handoff to drone 110-2 is needed, it sends a handoff message 264 to the drone 110-1. The drone radio sub-system 112-1 in turn sends a message 214-1 to the airplane 160 acknowledging the receipt of the handoff request. The message 264 contains information such as when the drone 110-1 will end communication with the airplane 160 and when the new drone 110-2 will take over data transmission from/to the airplane 160. Once a handoff sequence has started between a mobile platform and the drone network, the current drone 110-1 may inform the drone handoff candidate (i.e., new drone 110-2) to prepare for the mobile platform by sending a message 214-1 to the new drone 110-2. Alternatively, the airplane 160 may send a message 264 to the drone 110-2, informing it of the time when the previous drone 110-1 intends to end communication with the airplane, and thus the drone 110-2 must take over data transmission from/to the airplane 160. Gateways to the internet 130-1 and 130-2 must also be informed of the handoff in order to complete the handoff process. Drones 110-1 and 110-2 send messages 214-1 and 214-2 to the gateways 130-1 and 130-2, respectively, to inform them of the handoff. The new gateway 130-2 will take over communication between the airplane 160 and the internet 136 after the handoff is completed.

In another embodiment, if a new gateway 130-2 is not provided, after handoff the drone 110-2 instead sends data from/to the airplane 160 to the original drone 110-1 (via the drone antenna sub-systems 114d-2 and 114b-1). The original drone 110-2 then forwards this data to the original gateway 130-1. The drone switch sub-system 116-2 in this instance is responsible for switching data from/to the airplane 160 to the drone 110-2; additionally, the drone switch sub-system 116-1 is responsible for switching the data to the gateway 130-1. The above handoff process described for an airplane is similarly utilized clearly for a vehicle or a portable device carried by a person.

The handoff determination and execution may alternatively be initiated by the current drone with which the mobile platform is communicating. In this case, the mobile platform will send pilot strength measurements to the current drone. The drone, using information sent by the mobile platform, decides when a handoff is needed and sends messages initiating handoff to the airplane as well as other the drones and to the gateways.

Figure 9:
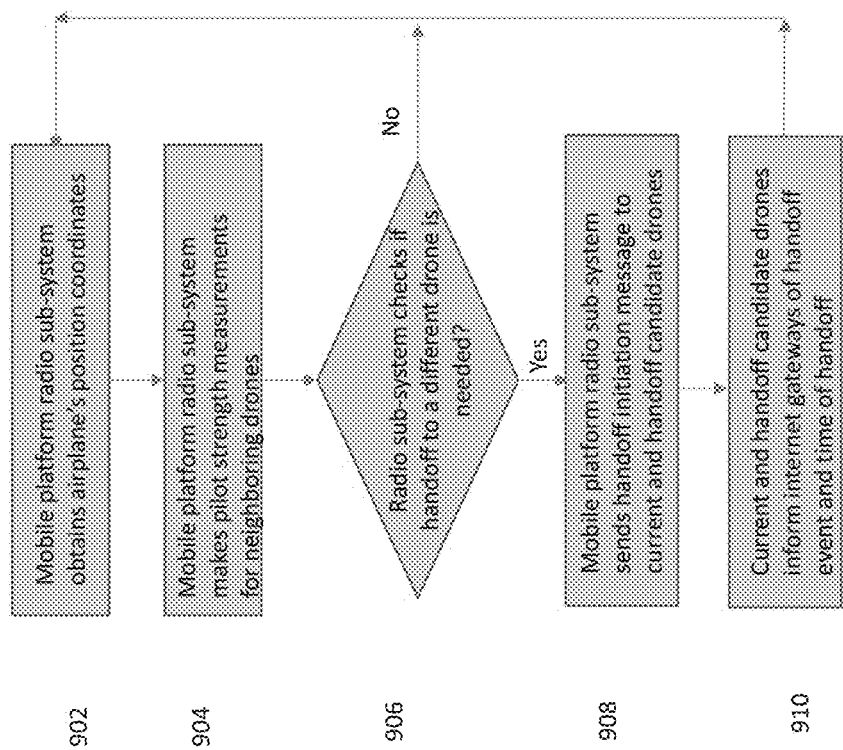
FIG. 9 is a logical flow diagram illustrating an exemplary process for handing off an airplane to a different drone.

FIG. 9 illustrates an exemplary method the mobile platform handoff process from one drone to another. In step 902, mobile platform radio sub-system obtains position coordinates of the platform. In step 904, the radio sub-system measures the pilot strength of drones that are visible to the mobile platform. In step 906, it is determined whether a handoff to another drone is needed. If handoff is needed, then in step 908 the mobile platform sends a handoff initiation message and time of handoff to the current drone with which it is communicating as well as the drone handoff candidate. In step 910, the current drone and the handoff drone candidates inform the internet gateways of the handoff event and the time handoff will take place.

While the foregoing handoff process is described with respect to a mobile platform initiated procedure, artisans of ordinary skill in the related arts will readily appreciate that the handover process may be initiated by the drone, the ground terminal, or another nearby radio access technology, the foregoing being merely illustrative.

For example, in one such example, the drone radio sub-system measures the received signal strength of the mobile platform. If the mobile platform's signal strength is rapidly fading, then the drone may instruct the mobile platform to start looking for another connection to handoff too. If the mobile platform is able to identify another connection (e.g., with another drone), then the mobile platform sends a handoff initiation message and time of handoff to the current drone with which it is communicating as well as the drone handoff candidate. Finally, the current drone and the handoff drone candidates inform the internet gateways of the handoff event and the time handoff will take place.

In another such example, a mobile platform may provide periodic measurements of a number of neighboring drones and any related inter-RAT type technologies. A network entity (such as a core network) may, based on the mobile platform's measurements, force the mobile platform to perform a handoff. This may be particularly useful where the network entity is aware of network conditions that the mobile platform is not privy to (e.g., impending network congestion, inter-RAT considerations, etc.).

Blocked Visibility—

Figure 6:
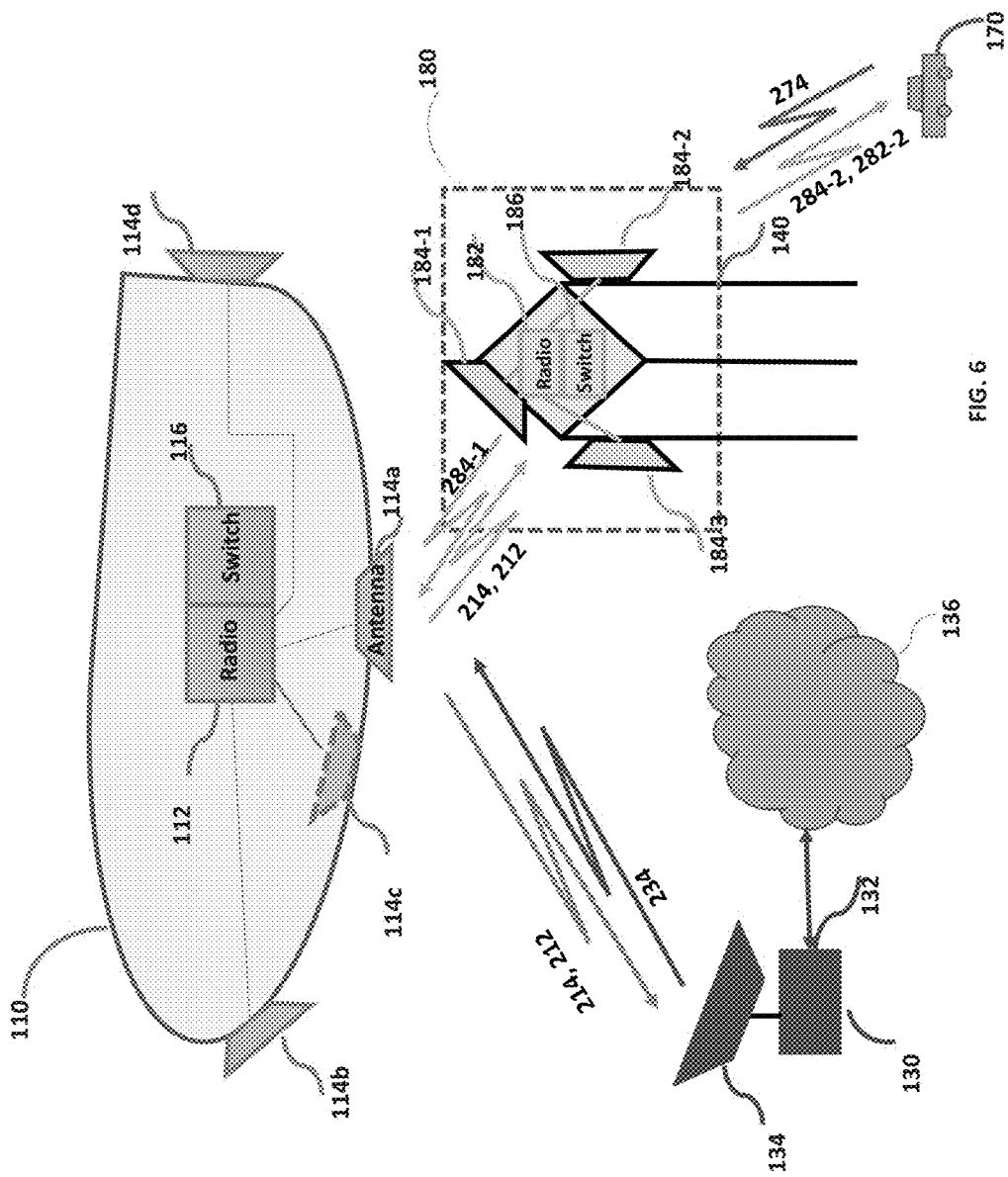
FIG. 6 is a block diagram illustrating an exemplary system for providing coverage to mobile platforms which have no visibility to drones.

Various objects, etc. may block visibility of a mobile platform to its associated drone. FIG. 6 illustrates one example where a building 140 is blocking the path from the drone 110 to the vehicle 170. If the path from a mobile platform, or a fixed terminal on the ground, to one drone is blocked, then as described above the mobile platform, or a fixed terminal, will search for other drones to which they have visibility.

When there are multiple drones in a network it is very likely the terminal will find a drone with which to communicate, a drone diversity effect. However, in some cases where the terminal is at the boundary of the drone network there may be only one drone visible to the terminal. Also, when the drone network is initially deployed there may be only a few drones in the network reducing the drone diversity effect. Therefore, in cases where the terminal has visibility to only one drone and also the elevation angle from the terminal to the drone is low which increases the probability of blockage by buildings or hill or trees, some other mechanism would be beneficial to improve the drone network coverage.

One solution to improving the drone network coverage, as shown in FIG. 6, is to install a terminal that is capable of communicating with the drone on top of building or some other structure that has unobstructed view to at least one drone. As FIG. 6 illustrates, terminal 180 comprises three antenna fixtures 184-1, 184-2, and 184-3, a radio sub-system 182 and a switch 186; however it is appreciated that any number of antenna fixtures may be utilized consistent with the present disclosure. The three antennas cover different directions from building 140. For example, antenna fixture 184-1 has visibility to the drone as well as to mobile/fixed terminals on one side of the building. The terminal 180 establishes a link to the drone, and links to mobile or fixed terminals on the ground that do not have visibility to any drone (e.g., indoor/underground, out of line-of-sight, etc.) For instance, as shown in FIG. 6, mobile platform 170 communicates with terminal 180 using terminal antenna 184-2, and terminal 180 in turn communicates with the drone which in turn completes the link between the mobile platform 170 and the internet 136 via gateway 130. In this fashion, terminal 180 acts as a relay between terminals that do not have visibility to a drone and the drone network.

Portable Devices—

Next, systems and methods for providing internet access to portable devices such as handsets and tablets are described.

As shown in Table 1 (provided below), a 0.56 meter dish antenna at 2 GHz at the drone and a 10 Watt tx (transmit) power into the antenna result in a C/N of almost 4.5 dB at the handset on 10 MHz of bandwidth. With C/N of 4.5 dB, one can achieve about 1 bit/second/Hz or more, i.e., a data rate of about 10 Mbps on 10 MHz of bandwidth. Therefore, with even as many as 20 beams being formed by the drone, one can achieve about 200 Mbps to all handsets in the coverage space of one drone.

TABLE 1

Exemplary Drone to handset link budget.

| | | | |
|---|---|---|---|
| Boltzmann constant | 1.38065E−23 | | |
| Temp | 290.00 | | |
| Thermal noise | −203.98 | dBW/Hz | |
| Handset noise figure | 5.00 | dB | |
| Noise floor/Hz | −198.98 | dBW/Hz | |
| Drone Tx power | 10.00 | W | Assumes 3 dB backoff from peak PA power |
| Drone Tx ant gain | 20.00 | dB | 0.56 dish at 2 GHz & 75% antenna efficiency |
| Drone EIRP | 26.99 | dBW | |
| BW | 10.00 | MHz | |
| Drone EIRP/Hz | −43.01 | dBW/Hz | |
| Handset Rx ant gain | −3.00 | dB | Internal handset antenna |
| Distance | 200.00 | km | |
| Frequency | 2.00 | GHz | |
| Path loss | −144.48 | dB | |
| Fade margin | 3.00 | dB | |
| Building loss | 0.00 | dB | |
| Body loss | 4.00 | dB | |
| Handset C/N | 4.49 | dB | |

It should be noted that the link budget of Table 1 assumes no building penetration loss. In other words, it is assumed that handset is outdoors and in clear line of sight to the drone. Even body loss of 4 dB in Table 1 assumes that the person's head, if handset is held to the head, is oriented toward the drone. If the handset is blocked by head or body then the body loss could be as high as 10 dB. Therefore, the capacity of 200 Mbps for one drone to handsets may be an upper bound and for handsets used in a cooperative manner in which the user is outdoor and holds the device toward the drone. A cost efficient way of using the drones to provide internet connectivity to handsets is illustrated in FIG. 7.

Figure 7:
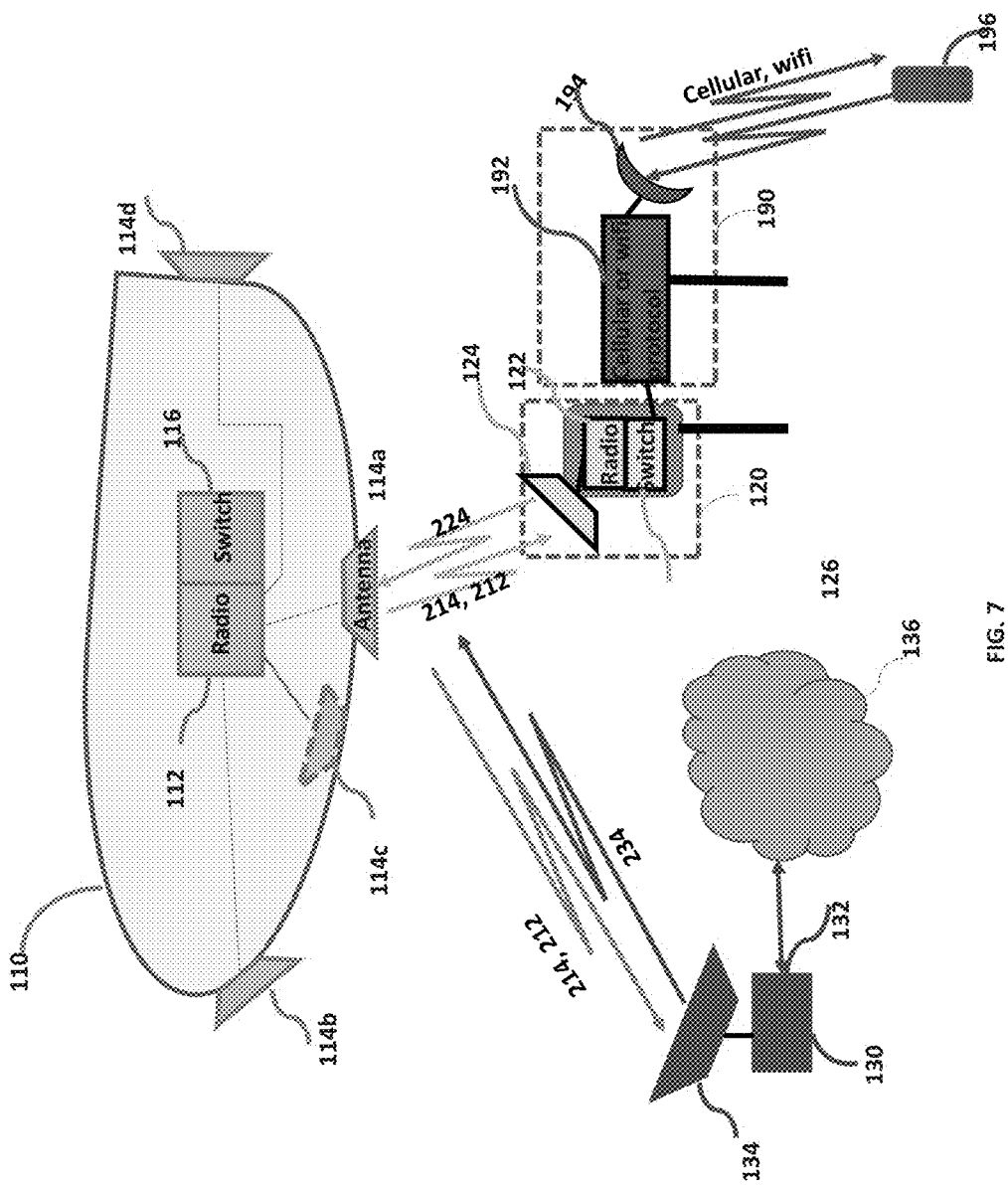
FIG. 7 is a block diagram illustrating an exemplary system for providing internet connectivity to portable devices.

FIG. 7 depicts a system where a fixed terminal 120 communicates with a drone 110 using an antenna subsystem 124. The switch sub-system 126 switches the data 214 received from the internet 136 via the drone 110 to a radio system 190. The radio system 190 in turn sends the data to the handset 196 via a cellular communications protocol such as 4G's LTE (Long Term Evolution) protocol, well known Wi-Fi protocols, or other similarly effective protocol.

Similarly data received at the radio system 190 from the handset 196 via cellular/Wi-Fi protocols is send to the radio system 120. The radio system 120 switch sub-system 126 switches the data to the drone 110 which in turn sends the data to the gateway 130 on its route to the internet 136. Note that communication between the terminal 120 and the drone 110 may be on a different frequency band than the communication between the handset 196 and the radio system 190. Since high data rates are needed on data links to the drone, higher frequencies in Ku or Ka band, where there is a large amount of spectrum, may be used for communications with the drone. The link between the handset 196 and the radio system 190 may occur at lower frequencies (such as between 1 to 6 GHz where cellular and Wi-Fi systems operate).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

What is claimed is:

1. A method of receiving broadband access at a mobile platform via a network of drones, comprising:
    determining a location of a drone of a communications drone network based at least in part on a list of drone locations that includes a list of line of sight (LOS) values, wherein each drone location of the list of drone locations comprises a corresponding LOS value;
    wherein the corresponding LOS value for each of the drone locations comprises a predetermined value that indicates signal strength for an unobstructed LOS between the drone and the mobile platform;
    steering an antenna aperture toward the location of the drone;
    determining whether a visibility of the drone is obstructed via the antenna aperture by measuring a signal strength and comparing the measured signal strength to the corresponding LOS value;
    when the visibility of the drone is not obstructed:
        searching for an optimal beam position within the antenna aperture along a first range of elevation and a second range of azimuth; and
        electronically forming an antenna beam at the optimal beam position, the electrically formed beam comprising an uplink data stream and a downlink data stream; and
    otherwise searching for a different drone on the list of drone locations.

2. The method of claim 1, further comprising:
    determining an orientation of the mobile platform; and where the steering comprises mechanical steering that is based at least in part on the orientation of the mobile platform.

3. The method of claim 1, where the mobile platform comprises multiple antenna apertures, and the method further comprises selecting the antenna aperture based at least in part on the location of the drone.

4. The method of claim 1, where the list of drone locations is received via a control channel broadcast.

5. The method of claim 1, where the list of drone locations is retrieved from memory.

6. The method of claim 1, further comprising provisioning a wireless local area network for a plurality of users, where uplink data generated by the plurality of users is sent via the uplink data stream and where the downlink data received by the downlink data stream is routed to various ones of the plurality of users.

7. A mobile platform configured to provide broadband access to at least one user, comprising:
one or more sensors configured to detect one or more mobile platform orientation changes;
logic configured to store a list of drone locations that comprises a list of line of sight (LOS) values, wherein each drone location of the list of drone locations comprises a corresponding LOS value;
wherein the corresponding LOS value for each of the drone locations comprises a predetermined value that indicates signal strength for an unobstructed LOS between a drone and the mobile platform;
an antenna sub-system configured to:
dynamically point beams toward a specific one of a network of drone apparatus, and measure a signal strength of the specific one of the network of drone apparatus;
when the signal strength substantially matches the corresponding LOS value, adjust the beams in response to the mobile platform orientation changes; and
when the signal strength does not match the corresponding LOS value, point the beams toward a different one of the network of drone apparatus; and
a radio sub-system configured to demodulate and decode received data.

8. The mobile platform of claim 7, further comprising a local area network sub-system configured to route the received data among a plurality of users based at least in part on addressing information.

9. The mobile platform of claim 7, where:
the antenna sub-system points the beam via a mechanical steering mechanism.

10. The mobile platform of claim 7, where the antenna sub-system comprises multiple antenna apertures; and
The antenna sub-system is configured to select an antenna aperture based at least in part on a drone location of the specific one of the network of drone apparatus.

11. The mobile platform of claim 7, where the list of drone locations is received via a control channel broadcast.

12. The mobile platform of claim 7, where the list of drone locations is retrieved from a memory.

13. A mobile platform configured to provide broadband access to at least one user, comprising:
one or more sensors configured to detect one or more mobile platform orientation changes;
logic configured to store a list of drone locations that comprises a list of line of sight (LOS) values, wherein each drone location of the list of drone locations comprises a corresponding LOS value;
wherein the corresponding LOS value for each of the drone locations comprises a predetermined value that indicates signal strength for an unobstructed LOS between a drone and the mobile platform;
an antenna sub-system configured to:
steer an antenna aperture toward a location of the drone;
measure a signal strength of the drone;
comparing the measured signal strength to the corresponding LOS value to determine whether a visibility of the drone is obstructed; and
when the visibility of the drone is not obstructed:
search for an optimal beam position within the antenna aperture along a first range of elevation and a second range of azimuth; and
electronically form an antenna beam at the optimal beam position, the electrically formed beam comprising an uplink data stream and a downlink data stream; and
otherwise search for a different drone on the list of drone locations.

14. The mobile platform of claim 13, wherein the list of drone locations that include the list of LOS values is retrieved from memory.

15. The mobile platform of claim 13, wherein the list of drone locations that include the list of LOS values is received from another drone.

16. The mobile platform of claim 13, wherein the list of drone locations that include the list of LOS values is received from a broadcast channel.

17. The mobile platform of claim 13, wherein the list of drone locations that include the list of LOS values is received from an out-of-band channel.

18. The mobile platform of claim 13, wherein the antenna sub-system is configured to use the list of drone locations when a first network coverage is lost.

19. The mobile platform of claim 13, wherein the list of drone locations further comprises trajectory information.

20. The mobile platform of claim 13, wherein the list of drone locations further comprises trajectory information, traffic information, capabilities information historic performance information, or synchronization assistance information.

21. The mobile platform of claim 13, wherein the list of drone locations is sorted according to the list of LOS values.

* * * * *